April 2, 1957 J. M. RHOADES 2,787,254
HYDRAULIC AMPLIFIER
Filed Sept. 19, 1955
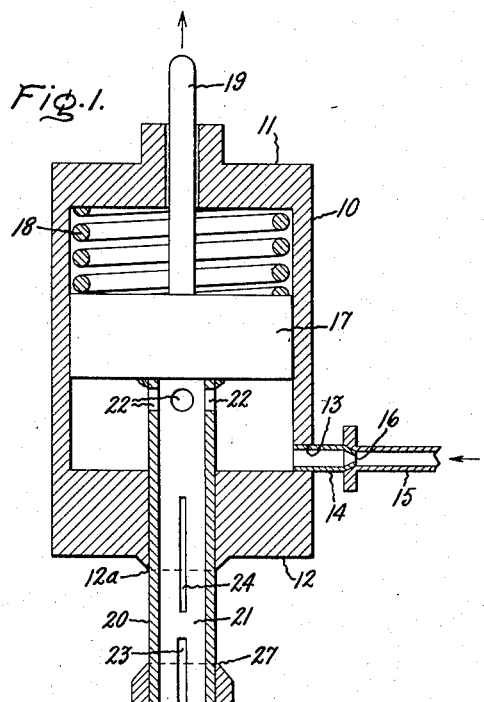
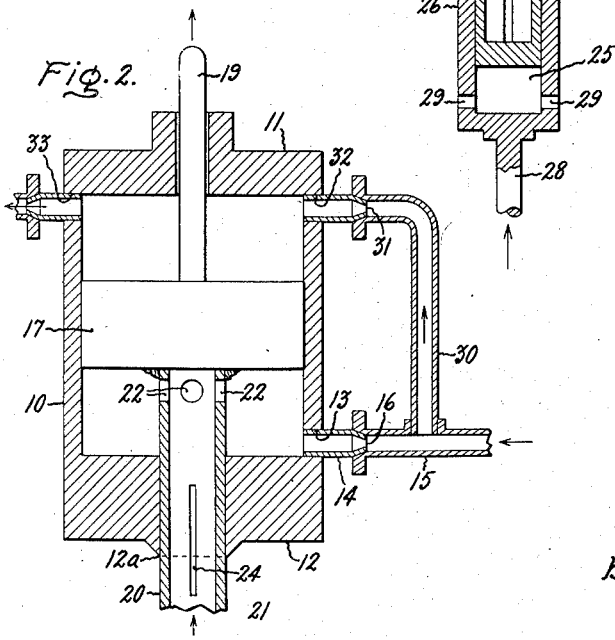
Inventor:
John M. Rhoades,
by Weston D. Monroe
His Attorney.

2,787,254

HYDRAULIC AMPLIFIER

John M. Rhoades, Waynesboro, Va., assignor to General Electric Company, a corporation of New York Application September 19, 1955, Serial No. 535,039

5 Claims. (Cl. 121—41)

This invention relates to fluid pressure amplifiers of the type which may be utilized to amplify both the force and motion of a control sensor. More particularly, this invention relates to a fluid pressure means of accomplishing mechanical multiplication of the force and motion of an input signal.

In most mechanical control systems, the motion and power level from the control sensor, or sensors, must be multiplied before operating additional members of the control system. Consequently, fluid pressure amplifiers for mechanically multiplying the motion and force of an input signal have been devised. A common disadvantage of such devices is that they require mechanical linkage and moving parts, with the result that a reasonably high level input signal is required to actuate the device and, as is common with devices using linkages, backlashing occurs.

Accordingly, an object of this invention is to provide a fluid pressure amplifier for multiplying the motion and power level of an input signal, which amplifier has a minimum of moving parts.

The novel features which are believed to be characteristic of this invention are set forth with particularity in the appended claims. The invention, however, both as to its organization and method of operation, together with further objects and advantages thereof, may best be understood by reference to the following description taken in connection with the accompanying drawing, in which:

Fig. 1 represents a side elevational view in section of one embodiment of this invention; and Fig. 2 illustrates a side elevational view in section of another embodiment of a power amplifier in accord with this invention.

The amplifier of this invention utilizes a fluid pressure actuated power amplifier which is illustrated as comprising a cylinder having a fluid pressure inlet port and a piston therein biased against movement due to fluid pressure at the inlet port by any suitable means, such as by a spring member positioned between the piston and one cylinder end wall or by an opposing fluid pressure. The piston is provided with an output motion transmitting shaft which extends out through one cylinder end wall and a hollow motion input shaft extending through the opposite cylinder end wall. The output motion transmitting shaft, the piston, and the motion input shaft form a unitary motion transmitting structure.

In order to provide motion amplification, the hollow motion input shaft is provided with an internal port inside the cylinder and two external ports outside the cylinder so that fluid pressure may be transmitted from the inlet port through the hollow motion input shaft. The two external ports are provided in order to produce linear motion amplification by means of orifice or port area feedback. A cup member is provided around the end of the input shaft which is outside the cylinder. The cup member has a port closing edge to control the area of one of the external ports of the input shaft in response to a control sensor and thereby determine the bleed area of the port. The other external port, which may be termed a feedback port, is positioned on the motion input shaft in such a manner that its bleed area is a function of the distance which the motion input shaft protrudes from the cylinder end wall. The fluid pressure in the cylinder, and hence the equilibrium position of the piston in the cylinder, then is determined by the pressure of the fluid at the inlet port and the free area of the two external ports, i. e., the total bleed area.

Referring specifically to Fig. 1, an enclosed cylinder 10 is provided with an upper end wall 11, a lower end wall 12, and a fluid pressure inlet port 13 for supplying fluid to the cylinder under pressure. Fluid pressure conduits 14 and 15 are provided to connect the fluid pressure inlet port 13 to a source of fluid which is not shown. In order to inject the fluid into the cylinder 10 at the desired pressure, an orifice 16 is utilized in the supply conduits 14 and 15.

A piston 17 is positioned inside the cylinder 10 and is biased by means of a spiral spring 18 against movement therein caused by fluid pressure at the inlet port 13. Since the fluid pressure inlet port 13 is below the piston 17, the spiral biasing spring 18 is positioned between the upper end wall 11 and the cylinder 10 and the piston 17.

In order to impart the motion of the piston 17 to a controlled element, an output motion transmitting shaft 19 is secured to the piston 17 and extends out through the upper cylinder end wall. A hollow motion input shaft 20 is also fixed to the piston 17 and extends out through the lower cylinder end wall 12. Thus, the hollow motion input shaft 20, the piston 17, and the output motion shaft 19 form a unitary motion transmitting structure.

In order to transmit the pressurized fluid from the inlet port 13 through the cavity 21 in the hollow input motion shaft 20, internal ports 22 are provided inside the cylinder 10, and external ports 23 and 24 are provided outside cylinder 10. The internal and external ports 22, 23, and 24 are all open to the cavity 21 in the hollow motion input shaft 20. As is set forth below, the two external ports 23 and 24 are provided in the hollow motion input shaft 20 in order to produce linear motion amplification by means of area feedback. The main bleed port or orifice 23 is located near the lower extremity of the hollow motion input shaft 20 and is shown as an elongated slot which extends longitudinally thereof. The additional auxiliary bleed port or feedback port 24 is positioned in the hollow motion input shaft 20 in such a manner that movement of the unitary motion transmitting structure in the cylinder 10 varies the area thereof.

As illustrated, the lower end of the motion input shaft 20 fits in a recess 25 of a cup member 26. The cup member 26 is provided with a port closing edge 27 which may be moved relative to the main bleed orifice 23 by means of an actuating shaft 28. The bottom of the cup member 26 is provided with ports 29 which vent the internal cavity 25 of the cup member and thus prevent the fluid utilized in the system from being trapped therein and impeding movement between the cup member 26 and the motion input shaft 20. The actuating shaft 28 is intended to be connected to a control sensor and thereby impart a motion to the cup member 26 in the direction of the longitudinal axis of the motion input shaft 20 in response to the movement of the control sensor.

A movement of the cup member 26 relative to the motion input shaft 20 changes the area of the main bleed port 23 and, as a consequence, the total bleed area of the external bleed ports 23 and 24. For example, if the cup member 26 is moved upwardly, the total bleed area will be diminished and the pressure will build up under the piston 17 to move it upwardly. Thus, the entire unitary motion transmitting structure moves upwardly. As the motion transmitting structure moves upwardly, the main bleed port 23 moves upwardly out of the cup member 26 so that the effective bleed area of the main bleed port 23 increases. While the area of the main bleed port 23 is increasing, the free area of the auxiliary bleed port 24 is reduced to provide an orifice area feedback. This is caused by the auxiliary bleed port 23 passing upwardly past the port closing lip 12a in the lower cylinder end wall 12. Since the orifice area feedback is accomplished by the interaction of the auxiliary bleed orifice 24 and the port closing lip 12a, the auxiliary bleed port 24 may properly be referred to as the feedback orifice or port.

Since the width of the feedback port 24 is less than the width of the main port 23, the overall bleed area will increase as the hollow motion input shaft 20 rises to clear the main bleed port 23. The motion amplification provided is equal to the width of the main bleed port 23 divided by the difference between the width of the two bleed ports 23 and 24. Neglecting the spring gradient, the movement of the motion input shaft 19 relative to the movement of the actuator shaft 28 then is determined by the relative widths of the main bleed port 23 and the feedback bleed port 24, and the power amplification is limited only by the hydraulic or pneumatic reaction on the cup member 25. The motion amplification is also affected by the spring gradient but this gradient is kept small.

It will also be understood that the system will operate for either an upward or a downward movement on the actuator shaft, and that downward movement of the actuator shaft 28 will give a larger total bleed port area and thereby reduce the pressure in the cylinder 10 beneath the piston 17. The biasing spring 18 will then force the motion transmitting structure downwardly. Due to the fact that the main bleed port 23 is wider than the feedback bleed port 24, the overall bleed port area is reduced by a downward movement of the motion input shaft 20, and the motion transmitting structure will continue a downward motion until a condition of equilibrium again exists between the pressure under the piston 17 and the biasing spring 18.

As previously indicated, the placement of the fluid pressure port relative to the cylinder is unimportant, i. e., the system may be changed to accommodate a power amplifier element where an increased pressure in the cylinder 10 will raise the piston 17, as illustrated, or where an increased pressure in the cylinder will lower the piston. The latter condition would exist if the fluid pressure inlet port 13 were positioned above the piston 17 and the biasing spring 18 were positioned below the piston. In such a case, it would be necessary to provide a means for transmitting the fluid pressure from the inlet port through the piston 17 and hollow input shaft 20 to the bleed ports 23 and 24.

Fig. 2 illustrates a modification of this invention in which the spring and piston arrangement illustrated in Fig. 1 is replaced by a double-acting piston. That is to say, the piston biasing force is produced by a fluid pressure on the upper surface of the piston 17. The biasing force is established by bleeding a small amount of the fluid supplied ahead of the orifice 16 through a conduit 30 and similar orifice 31 into the cylinder 10 through an inlet port 32 above the piston 17. The volume over the piston is vented through a fixed discharge orifice 33.

With this arrangement, a change in area of the external bleed ports 23 and 24 in response to movement of the cup member 26 causes a change in fluid pressure in the cylinder 10 under the piston 17. As previously described, since the fluid pressure above the piston is constant for a constant fluid pressure at the supply conduit 15, a change of fluid pressure beneath the piston 17 will cause a movement of the unitary motion transmitting structure in a direction to restore the system to an equilibrium position. Thus, power and motion amplification is accomplished in the same manner as described with reference to the embodiment of the invention illustrated in Fig. 1. The distinction between the two embodiments of the invention is that the piston biasing force which is supplied by the biasing spring 18 in the embodiment of Fig. 1 is supplied by the fluid pressure supply in the embodiment illustrated in Fig. 2.

By providing the piston biasing force from the fluid pressure supply, the amplifier may be made substantially insensitive to variations in the supply pressure and the motion gain is not affected by the force gradient associated with a spring.

While particular embodiments of this invention have been shown, it will be understood that the invention is not limited thereto since many modifications in both the physical arrangement and in the instrumentalities employed may be made. It is contemplated that the appended claims will cover any such modifications as fall within the true spirit and scope of this invention.

What I claim as new and desire to obtain by Letters Patent of the United States is:

1. A fluid pressure amplifier having an enclosed cylinder with a fluid pressure inlet port, a piston disposed in said cylinder for operation by fluid pressure at said inlet port and a spring member biasing said piston against movement thereby, an output motion transmitting shaft and a hollow motion input shaft extending through opposite end walls of said cylinder and operably connected to said piston to form a motion transmitting structure therewith, said hollow motion input shaft having at least a pair of external ports venting fluid from said inlet port, means to vary the area of one of said external ports in response to a control signal and thereby affect operation of said fluid pressure amplifier, and means to vary the area of said other external port in response to the operation of said fluid pressure amplifier in an inverse manner relative to the variation in area of said one external port to provide motion amplification by area feedback.

2. A fluid pressure amplifier having an enclosed cylinder with a fluid pressure port, a piston disposed in said cylinder for operation by fluid pressure at said inlet port, and means for introducing a portion of the fluid supplied to said inlet port into said cylinder on the opposite side of said piston, an output motion transmitting shaft and a hollow motion input shaft extending through opposite end walls of said cylinder and operably connected to said piston to form a motion transmitting structure therewith, said hollow motion input shaft having at least a pair of external ports venting fluid from said inlet port, means to vary the area of one of said external ports in response to a control signal and thereby affect operation of said fluid pressure amplifier, and means to vary the area of said other external port in response to the operation of said fluid pressure amplifier in an inverse manner relative to the variation in area of said one external port to provide motion amplification by area feedback.

3. A fluid pressure amplifier having an enclosed cylinder with a fluid pressure inlet port, a piston disposed in said cylinder for operation by fluid pressure at said inlet port and biased against movement thereby, an output motion transmitting shaft and a hollow motion input shaft extending through opposite end walls of said cylinder and operably connected to said piston to form a motion transmitting structure therewith, said hollow motion input shaft having at least a pair of external ports and said motion transmitting structure having an internal port inside said cylinder, said internal and external ports communicating with the passage in said input shaft for transmitting pressurized fluid from said inlet port to said external ports, a cup member having a port closing edge positioned around said motion input shaft in such a manner as to obstruct fluid flow through one of said external ports and thereby determine the open area of said one external port, means to move said closing edge of said cup member relative to said one external port in response to a control signal and thereby cause a movement of said motion transmitting structure, and means to vary the area of said other external port in response to movement of said motion transmitting structure in an inverse manner relative to the variation in area of said one external port to provide motion amplification by area feedback.

4. A fluid pressure amplifier having an enclosed cylinder with a fluid pressure inlet port, a piston disposed in said cylinder for operation by fluid pressure at said inlet port and a spring member biasing said piston against movement thereby, an output motion transmitting shaft and a hollow motion input shaft extending through opposite end walls of said cylinder and operably connected to said piston to form a motion transmitting structure therewith, said hollow motion input shaft having at least a pair of external ports and said motion transmitting structure having an internal port inside said cylinder, said internal and external ports communicating with the passage in said input shaft for transmitting pressurized fluid from said inlet port to said external ports, a cup member having a port closing edge positioned around said motion input shaft in such a manner as to obstruct fluid flow through one of said external ports and thereby determine the open area of said one external port, means to move said closing edge of said cup member relative to said one external port in response to a control signal and thereby cause a movement of said motion transmitting structure, and means to vary the area of said other external port in response to movement of said motion transmitting structure in an inverse manner relative to the variation in area of said one external port to provide motion amplification by area feedback.

5. A fluid pressure amplifier having an enclosed cylinder with a fluid pressure port, a piston disposed in said cylinder for operation by fluid pressure at said inlet port, and means for introducing a portion of the fluid supplied to said inlet port into said cylinder on the opposite side of said piston, an output motion transmitting shaft and a hollow motion input shaft extending through opposite end walls of said cylinder and operably connected to said piston to form a motion transmitting structure therewith, said hollow motion input shaft having at least a pair of external ports and said motion transmitting structure having an internal port inside said cylinder, said internal and external ports communicating with the passage in said input shaft for transmitting pressurized fluid from said inlet port to said external ports, a cup member having a port closing edge positioned around said motion input shaft in such a manner as to obstruct fluid flow through one of said external ports and thereby determine the open area of said one external port, means to move said closing edge of said cup member relative to said one external port in response to a control signal and thereby cause a movement of said motion transmitting structure, and means to vary the area of said other external port in response to movement of said motion transmitting structure in an inverse manner relative to the variation in area of said one external port to provide motion amplification by area feedback.

References Cited in the file of this patent

UNITED STATES PATENTS

| | | |
|---|---|---|
| 1,834,773 | Fellmann et al. | Dec. 1, 1931 |
| 2,358,894 | Volet | Sept. 26, 1944 |
| 2,396,951 | Horstmann | Mar. 19, 1946 |
| 2,615,466 | Garde | Oct. 28, 1952 |

FOREIGN PATENTS

| | | |
|---|---|---|
| 423,676 | Germany | Jan. 8, 1926 |